(12) United States Patent
Pooley (10) Patent No.: US 11,002,613 B2
(45) Date of Patent: May 11, 2021

(54) INDUCTIVE TEMPERATURE SENSING

(71) Applicant: TTP Plc, Royston (GB)

(72) Inventor: David Pooley, Royston (GB)

(73) Assignee: TTP Plc., Royston (GB)

( * ) Notice: Subject to any disclaimer, the term of this patent is extended or adjusted under 35 U.S.C. 154(b) by 300 days.

(21) Appl. No.: 15/769,985

(22) PCT Filed: Oct. 18, 2016

(86) PCT No.: PCT/GB2016/053233
§ 371 (c)(1),
(2) Date: Apr. 20, 2018

(87) PCT Pub. No.: WO2017/068337
PCT Pub. Date: Apr. 27, 2017

(65) Prior Publication Data
US 2018/0313700 A1    Nov. 1, 2018

(30) Foreign Application Priority Data

Oct. 23, 2015    (GB) ..................................... 1518809

(51) Int. Cl.
*G01K 7/38*    (2006.01)

(52) U.S. Cl.
CPC ........... *G01K 7/38* (2013.01); *G01K 2207/06* (2013.01)

(58) Field of Classification Search
CPC ............ G01K 7/00; G01K 7/36; G01K 13/00; G01K 15/00; G01K 2207/06; G01K 7/38; H05B 6/04; H05B 6/06; H05B 6/10; H05B 6/104; H05B 6/362
See application file for complete search history.

(56) References Cited

U.S. PATENT DOCUMENTS

| | | | | |
|---|---|---|---|---|
| 2,350,329 A | * | 6/1944 | Hornfeck | G01K 7/38 374/168 |
| 2,407,360 A | * | 9/1946 | White | H03L 1/02 331/176 |
| 2,509,048 A | * | 5/1950 | Vogelsang | G01K 7/021 374/110 |

(Continued)

FOREIGN PATENT DOCUMENTS

| | | | |
|---|---|---|---|
| CN | 200977058 Y | * 11/2007 | |
| DE | 3603950 A1 | * 8/1987 | G01D 3/036 |

(Continued)

OTHER PUBLICATIONS

International Search Report dated Jan. 16, 2017, in International Application No. PCT/GB2016/053233; Filed: Oct. 18, 2016 Applicant: The Technology Partnership PLC.

(Continued)

*Primary Examiner* — Gail Kaplan Verbitsky
(74) *Attorney, Agent, or Firm* — Erise IP, P.A.

(57) ABSTRACT

An apparatus for inductive temperature sensing comprises a coil configuration, a target, and an impedance measurement circuit. The target has a non-zero conductivity and susceptibility and the impedance measurement circuit measures the apparent inductance of the coil configuration at a measurement frequency close to the crossover frequency to provide an indication of temperature of the target.

18 Claims, 9 Drawing Sheets

(56) References Cited

U.S. PATENT DOCUMENTS

| | | | | |
|---|---|---|---|---|
| 2,619,604 A * | 11/1952 | Burns, Jr. | ................ | H03H 9/22 310/26 |
| 2,695,475 A * | 11/1954 | Ellis | ................ | C03B 27/067 65/116 |
| 2,982,928 A * | 5/1961 | Kall | ................ | H03H 7/0115 333/167 |
| 3,096,196 A * | 7/1963 | Bettoli | ................ | C09D 195/00 428/143 |
| 3,303,701 A * | 2/1967 | Matsuura | ................ | G01K 13/08 374/120 |
| 3,421,374 A * | 1/1969 | Lawrence | ................ | G01K 7/38 374/184 |
| 3,452,597 A * | 7/1969 | Grady, Jr. | ................ | G01K 7/32 374/117 |
| 3,525,041 A * | 8/1970 | Velsink | ................ | G01R 33/07 324/117 R |
| 4,151,493 A | 4/1979 | Lewandowski | | |
| 4,606,071 A * | 8/1986 | White, Jr. | ................ | H04R 3/04 381/103 |
| 4,771,238 A * | 9/1988 | Caruso | ................ | G01B 7/10 324/229 |
| 5,227,597 A | 7/1993 | Dickens et al. | | |
| 9,829,386 B2 * | 11/2017 | Hansen | ................ | G01K 3/14 |
| 2004/0054486 A1 | 3/2004 | Schilling et al. | | |
| 2010/0086608 A1 * | 4/2010 | Mitchnick | ........ | G01N 33/54373 514/1.1 |
| 2011/0090937 A1 | 4/2011 | Malyshev et al. | | |
| 2014/0362888 A1 * | 12/2014 | Hansen | ................ | G01N 33/49 374/33 |
| 2015/0060439 A1 * | 3/2015 | Pankratz | ................ | H05B 6/105 219/660 |
| 2016/0100459 A1 * | 4/2016 | Fukutani | ................ | C21D 1/04 219/660 |

FOREIGN PATENT DOCUMENTS

| | | |
|---|---|---|
| DE | 10 2013 008068 A1 | 11/2014 |
| GB | 1 444 155 | 7/1976 |
| JP | 0413956 A | 1/1992 |
| JP | 04013956 A * | 1/1992 |
| SU | 697841 A * | 11/1979 |
| SU | 1476327 A * | 4/1989 |

OTHER PUBLICATIONS

Written Opinion of the International Searching Authority dated Jan. 16, 2017, in International Application No. PCT/GB2016/053233; Filed: Oct. 18, 2016 Applicant: The Technology Partnership PLC.

* cited by examiner

Figure 1: (below)

INDUCTIVE TEMPERATURE SENSING

RELATED APPLICATIONS

The present application is a national stage application under 35 U.S.C. § 371 of International Application No. PCT/GB2016/053233, filed 18 Oct. 2016, which claims priority to Great Britain Patent Application No. 1518809.7, filed 23 Oct. 2015. The above referenced applications are hereby incorporated by reference into the present application in their entirety.

FIELD

This invention relates to inductive methods of measuring temperature and their application in induction heating applications.

Many prior art temperature sensing methods such as thermocouples and resistive temperature detector (RTD) sensors require thermal contact between the sensor. This approach is limited at extremely high temperatures or in aggressive chemical environments, where sensors may have limited lifetimes. These methods are also difficult to apply to moving or vibrating parts, as connecting wires are required to transfer the signal to external electronics. The connecting wires also make it difficult to maintain thermal insulation between the part being measured and the external electronics/outside world. High pressures or vacuum are often associated with measurement at high or low temperatures, which adds an extra level of complexity to the electrical connections. These factors, combined with other ageing mechanisms such as thermal cycling mean that the electrical feedthroughs, connectors and wiring often have a high cost and/or poor reliability. Hence a non-contact temperature measurement is desirable in many applications.

Infrared temperature sensing is often used where non-contact temperature sensing is required, but this suffers from several drawbacks including limited operation temperature of the sensor, accumulation of dirt on optics, inaccuracy due to unknown or variable emissivity, and the need for line-of-sight operation, which increases cost and limits the amount of thermal insulation which can be applied.

This invention describes a non-contact inductive temperature sensing method which overcomes these disadvantages. It also provides benefits of sensing temperature independently of the geometry and/or position of the sensed part and of measuring the average temperature over an extended region. Further benefits will be described later and be apparent to those skilled in the art.

The invention teaches an apparatus for inductive temperature sensing comprising a coil configuration, a target, an excitation circuit and a measurement circuit, wherein the target is made of a material or a composite of materials which, as a whole, has a non-zero conductivity and magnetic susceptibility; the excitation circuit excites the coil configuration or parts of the coil configuration close to or exactly at the crossover frequency; and the measurement circuit measures the apparent inductance of the coil configuration.

Furthermore, the invention teaches a food-cooking mixer for the processing and preparation of food which uses the same principles.

According to one embodiment, the apparatus for inductive temperature sensing is provided with a target which functions as an induction heating target as well as a sensing target. The coil configuration can fulfil the function of inductive heating as well as of sensing. Preferably, the target is made of a material or a composite of materials so that the target as a whole exhibits a conductivity that decreases as temperature increases over the measured range. The target may be made of a material or a composite of materials so that the target as a whole has a susceptibility that decreases as temperature increases over the measured range. In a preferred embodiment, the target is made of a magnetic steel.

Effective magnetic susceptibility, and thus effective permeability, and effective conductivity values of the target can be achieved by means of a composite construction. The target can be made of a composite of a thermistor material, i.e. a material whose resistivity varies with temperature, and a magnetic material, i.e. a material with non-zero magnetic susceptibility. With regard to a preferred embodiment of the invention, the target is made of a composite of materials which includes magnetic materials with different Curie temperatures.

The coil configuration and target may be substantially planar. The coil configuration can be wrapped around the outer perimeter of the target. Preferably, the coil configuration consists of two separate parts: at least one coil for the inductive heating, also referred to as heating coil in this application, and at least one coil for sensing, also referred to as sensing coil in this application. The sensing coil can be substantially balanced with respect to the heating coil.

Particularly, the induction heating can be interrupted in order to make a temperature measurement. The interval between temperature measurements can be varied. The measurement circuit preferably includes a negative impedance converter. The negative impedance converter can form a negative reference inductor, which can be connected in series with the coil configuration or parts of the coil configuration.

Additionally, the invention refers to a method for sensing the temperature of a target in which; an AC signal is applied to a coil configuration; eddy currents are induced in a target with non-zero conductivity and magnetic susceptibility; the apparent impedance of the coil configuration is measured at a frequency close to the crossover frequency (defined as the frequency where the apparent inductance, determined by evaluating the measured apparent impedance, is substantially independent of the separation between the coil configuration and the target).

Furthermore, the invention refers to an apparatus for inductive heating and temperature sensing comprising a coil configuration, a target, excitation circuit and a measurement circuit characterised in that the target comprises a layer of thermistor material and a layer of magnetic material; the excitation circuit operates at lower than 300 kHz, or more preferably between 20 kHz and 100 kHz; the measurement circuit measures the apparent impedance of the sensing coil at a different frequency. According to an embodiment of the invention the measurement circuit measures the apparent impedance of the sensing coil at a frequency between 1 MHz and 100 MHz. The measurement circuit can measure the apparent impedance at a frequency where the apparent impedance does not vary greatly with geometric tolerances. In particular the measurement circuit may measure the apparent inductance of the sensing coil or the apparent resistance of the sensing coil close to or at the crossover frequency.

The invention uses for the measurement of temperature a coil configuration and a target, whose properties have a known temperature dependence. The heating coil is excited with an AC signal and the impedance of the sensing coil is measured at a certain frequency or frequencies in order to determine the temperature of the target.

Certain methods are used to ensure that the sensitivity to temperature is high compared to sensitivity to other effects. Potential causes of cross-talk and inaccuracy that are reduced or eliminated include heating of the sensing coil, geometric tolerances and positional tolerances between parts of the system.

A range of aspects of the invention are now disclosed with reference to the following figures, in which.

FIG. 1(a) shows the elements of the inductive temperature sensing system. A coil configuration (100) is energised by an AC signal from an excitation circuit (104). The apparent impedance of the coil configuration is measured or inferred by a measurement circuit (105). Note that the excitation and measurement functions can be integrated into a single circuit, such as microprocessor, and together form an "impedance measurement circuit" (106). The apparent impedance of the coil configuration is affected by the properties and temperature of the target (101). The target is conductive and magnetically susceptible, i.e. has a non-zero magnetic susceptibility, also referred to as being permeable. The frequency at which the apparent inductance of the coil configuration (100) is equal to the inductance of the coil configuration (100) without the target (101) present is measured. We call this frequency the cross-over frequency in the application. Measuring cross-over frequency forms the basis of the temperature measurement, as described in more detail in this application.

FIG. 1(b) shows an inductive temperature sensing system in planar format. The coil configuration (100) is energised with an AC signal. The apparent impedance of the coil configuration is affected by the properties and temperature of the target (101). A shielding material (102) can be used to reduce the amount of stray magnetic field that is present. The stray field can result in unwanted cross-sensitivity to or inductive heating of other nearby objects. In this embodiment, the target is made of a material with non-zero electrical conductivity and magnetic susceptibility, such as a magnetic steel. The shielding material is a permeable material, such as ferrite. The coil configuration (100) can be a wound component or a coil realized by connections on a printed circuit board. The arrangement of the inductive temperature sensing system is illustrated in an axisymmetric format, with a symmetry axis (103). However, it will be apparent to those skilled in the art that the invention can also be applied in different formats, for example with a square or rectangular shaped coil configuration and target.

FIG. 1(c) shows an inductive temperature sensing system in "wraparound" format. In this arrangement, the coil configuration (100) surrounds the target (101), which is formed into a cylindrical or tubular shape. Permeable shielding material (102) can be used to reduce stray field and increase sensitivity. The arrangement of the inductive temperature sensing system is illustrated in an axisymmetric format, with a symmetry axis (103) and circular cross-sections, but could also operate with, for example, a square or rectangular cross-section.

FIG. 1(d) shows a planar format inductive temperature sensing system used as part of a domestic food processor. In this arrangement, the coil configuration (100) is made of inductive heating coil and sensing coil, and the target (101) is made of material susceptible for inductive heating. Thermally insulating material (116, 117), such as plastic, foam or glass, is used to reduce heat flow from the hot bowl to the coil configuration. Preferably, some of the insulating material (116) is attached to the bowl, so that the user is protected from high temperatures, and some forms the casework (117) of the base unit. The shielding material (102) reduces parasitic inductive heating of the mixing blade (113), mixing shaft (114), bearing (119), and the motor (115). The target (101) and bowl (118) can, optionally, be made from a single part of magnetic stainless steel, or can be made from separate parts, welded or otherwise joined together.

Figure 2:
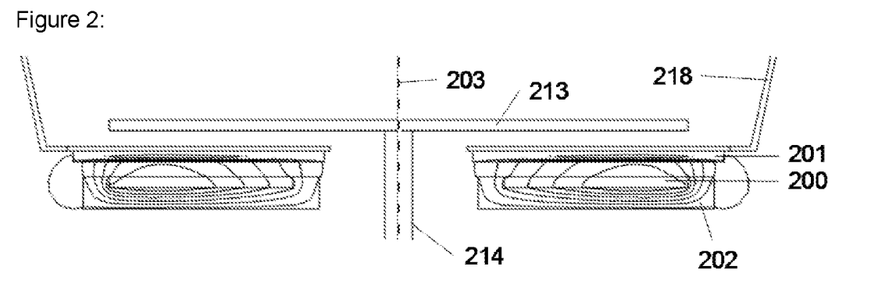
FIG. 2 illustrates the magnetic field from the excited coil configuration

FIG. 2 shows a finite element simulation of the field from a planar coil configuration (200). The coil configuration (200), target (201) and permeable shield (202) are circular, with the symmetry axis shown as a dashed line (203). The magnetic field lines with excitation at 10 kHz are shown. It can be seen that there is little or no stray field leakage which could cause unwanted heating of the sides of the bowl (218) or of the mixing blade (213) or mixing shaft (214). In addition to this, the induced eddy currents are quite evenly distributed throughout the target (201). These effects make this geometry suitable for induction heating applications. The even distribution of the eddy currents in the target (201) also mean that the temperature measurement becomes an average temperature measurement over this region. The target is made of a magnetic steel, which is favourable for high efficiency induction heating. The induction heating can be performed efficiently in the frequency range 20 kHz-100 kHz, for which there are well-established drive and control techniques, and for which any acoustic noise generated due to magnetostriction is ultrasonic and hence inaudible for the human.

Figure 1:
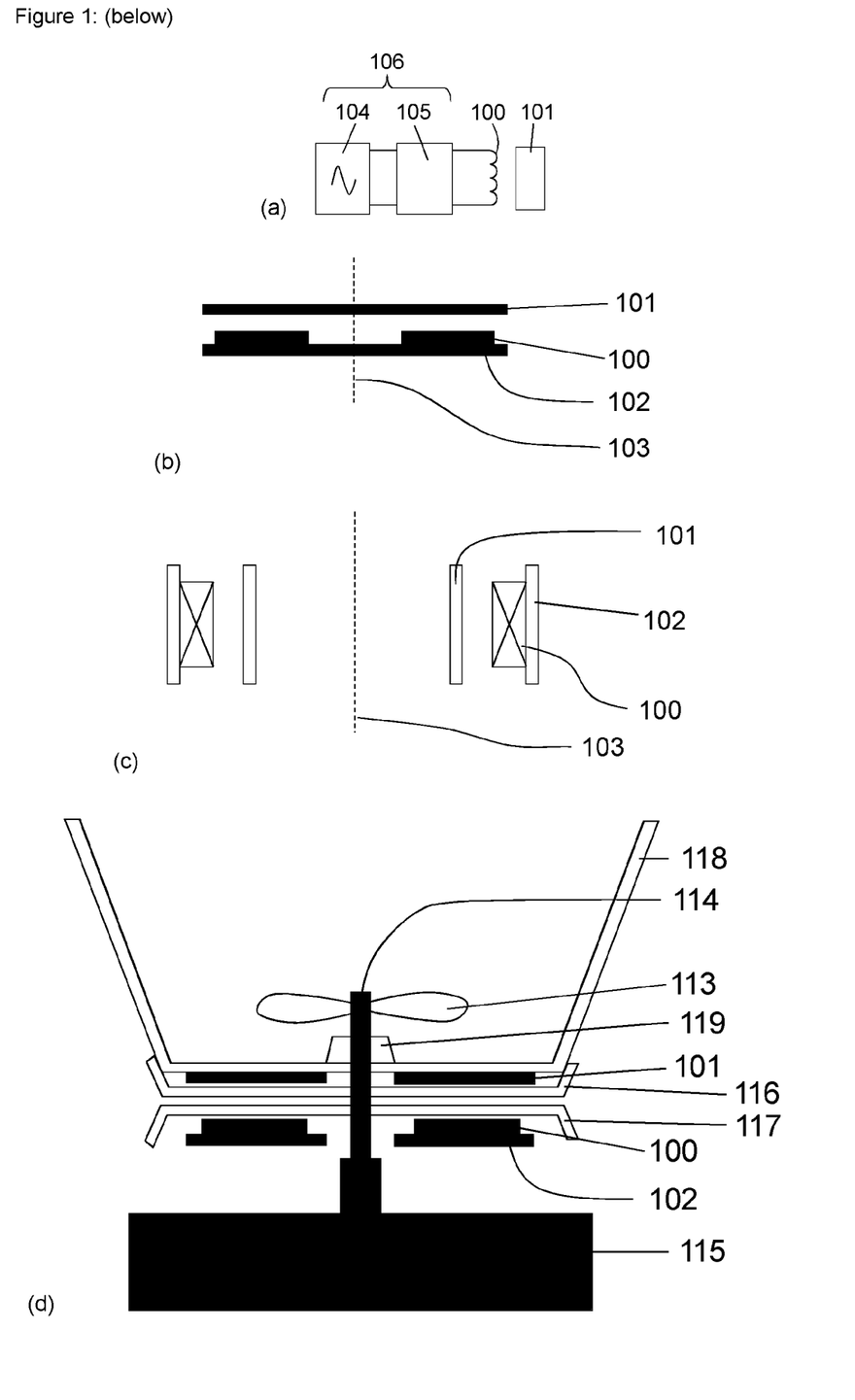
FIGS. 1(a)-(d) illustrate an embodiment of the inductive temperature sensing system
Figure 3:
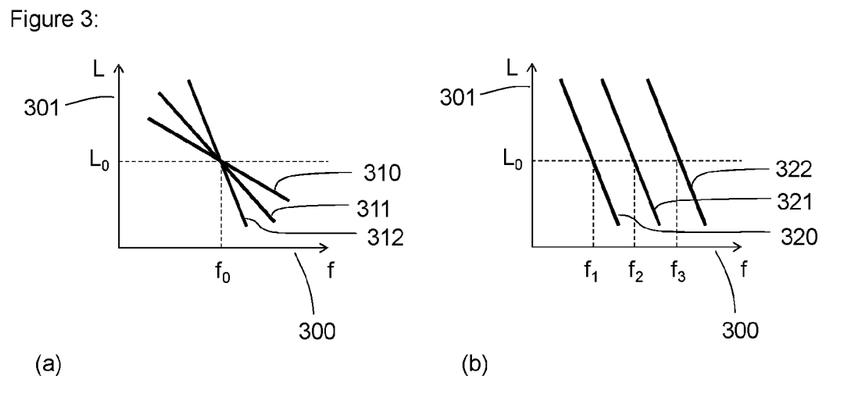
FIGS. 3(a)-(b) illustrate the apparent inductance measured by the measurement circuit

FIG. 3 illustrates the inductance as function of the frequency during a measurement process in the systems shown in FIGS. 1 and 2. The graphs show frequency on the horizontal axis (300) and the apparent inductance of the coil configuration on the vertical axis (301). FIG. 3(a) shows the apparent inductance of the coil configuration for a range of separation distances between the coil configuration (200) and target (201), hereafter called the "gap". For a large gap, the apparent inductance of the coil configuration changes slowly with frequency (trace 310). As the gap decreases, the gradient of the inductance vs. frequency curve increases, as shown by trace 311 for a medium gap and 312 for a small gap. However, there is a frequency, $f_0$, at which the apparent inductance of the coil configuration is largely independent of the relative positions of the coil configuration and target. This frequency $f_0$ is hereafter called the crossover frequency. With simple geometries, the crossover inductance, $L_0$, is equal to the value of the inductance of the coil configuration without the target present. At the crossover frequency, the competing effects of the conductivity and magnetic susceptibility of the target cancel one another out, and the phase of the eddy currents are such that the load appears resistive. The crossover frequency is proportional to the susceptibility $\chi = \mu_r - 1$, with $\mu_r$ the relative permeability and the inverse conductivity $\sigma$ of the target. It also has some dependence on geometric factors, in particular the crossover frequency is proportional to coil configuration diameter, D, raised to the power −1.4. In a simple geometry, the crossover frequency is approximately given by:

$$\left(\frac{f_0}{\text{kHz}}\right) = 250 \left(\frac{D}{\text{mm}}\right)^{-1.4} \chi \left(\frac{\sigma}{\text{MS/m}}\right)^{-1}$$

so that for a 100 mm diameter coil configuration and target made of a magnetic steel, $f_0$ tends to fall in the range 5 kHz to 200 kHz, depending on the conductivity and susceptibility of the particular steel grade that is used. Experimentally, using a shielded planar coil configuration, crossover frequencies for selected steels at room temperature are measured as follows: 420 stainless—7 kHz; 444 stainless—13 kHz; 430 stainless—23 kHz, invar—52 kHz.

At low frequencies ($f < f_0/10$), magnetic effects dominate and the apparent inductance asymptotically approaches a constant value. This value depends on the material susceptibility and the gap. At high frequencies ($f > f_0 * 10$), conductivity dominates and the apparent inductance asymptotically approaches a lower constant value. This value depends on the gap. Hence, a calibration measurement at high frequency may be used to measure the gap and a calibration measurement at low frequency may be used to measure the material susceptibility, knowing the gap. Advantageously, this calibration step is applied when samples to be measured (targets) are of variable susceptibility. Preferably this step is performed when a new target is introduced to the system or on start-up of the system.

FIG. 3(b) shows the apparent inductance of the coil configuration vs. frequency at three temperatures, $T_1$ (trace 320), $T_2$ (trace 321) and $T_3$ (trace 322). For this particular target, $T_1 < T_2 < T_3$. As the temperature increases from $T_1$ to $T_3$, the conductivity of the target decreases more rapidly than the susceptibility decreases and so the ratio $\chi/\sigma$ increases. Hence the crossover frequency increases from $f_1$ to $f_3$. As the crossover frequency is largely independent of gap for any given temperature, it provides a measurement of target temperature that is substantially independent of gap. Measurement of the apparent inductance close to the crossover frequency (e.g. at $f_0 \pm 20\%$) and interpolation or extrapolation can also be used to infer the cross-over frequency. The measurement frequency or frequencies are preferably within ±30% and more preferably within ±10% of the crossover frequency.

Other materials than magnetic steel can also be used for building a target, such materials that have properties that change in a different manner with temperature. Composite materials can also be designed to exhibit the same properties as magnetic steel. For example, a number of permeable particles in a conductive matrix or on a conductive backing layer will exhibit similar properties as magnetic steel, as will conductive and permeable particles or fibres in an insulating matrix, as will an appropriately arranged multilayer structure of permeable and conductive layers.

Another example of a material used for building a target with temperature dependent properties is a material operated in a temperature range approaching its Curie temperature. Material susceptibility will decrease rapidly with increasing temperature if a material is used close to its Curie temperature. If the decrease of susceptibility with rising temperature is more rapid than the decrease of the conductivity, $f_0$ will decrease. This approach has the advantage in induction heating applications of a self-limiting heating, as heat input per unit current reduces rapidly when approaching the Curie temperature. In the case of a target operated at temperatures close to but below the Curie temperature, the curves in FIG. 3(b) would represent the decreasing temperature from $T_1$ (trace 320) to $T_3$ (trace 322) (i.e. $T_1 > T_2 > T_3$). Layered or dispersed composites of materials with multiple different Curie temperatures can be used to linearise the temperature response over a wider range of temperatures than can be used with a single material. Control of material grain size and crystal structure, for example with heat treatment, can also be used to tune the curve of susceptibility vs. temperature. An example of a composite layered plate with more than one Curie temperature is shown in U.S. Pat. No. 5,227,597, where such structures are used to maintain a uniform temperature during induction cooking. However, inductive temperature sensing is not described in this patent.

Some materials have a magnetic susceptibility that increases with increasing temperature over a given temperature range. Many magnetic steels exhibit an increase in susceptibility (at low fields) over a range of temperatures from room temperature to 700° C., with some examples described in "Examination of Magnetic Properties of Several Magnetic Materials at High Temperature" by N. Takahashi et al. (IEEE Trans Magn. v46 p 548 2010). MnZn ferrite materials typically show an increase in susceptibility over a temperature range of 0-150° C. The shape of this susceptibility vs. temperature curve can be tuned by ferrite composition. Assuming a material with increasing susceptibility for rising temperature and decreasing conductivity for rising temperature is used for building a target the curves in FIG. 3(b) would represent the increasing temperature from $T_1$ (trace 320) to $T_3$ (trace 322) (i.e. $T_1 < T_2 < T_3$).

Approaches using targets made of a composite of materials have the advantages that bulk properties can be designed, for example to increase temperature sensitivity within a particular range or to select the cross-over frequency. However, they typically have higher cost and complexity. The behaviour in these cases can be more complex, but the same temperature sensing method can be applied.

Figure 4:
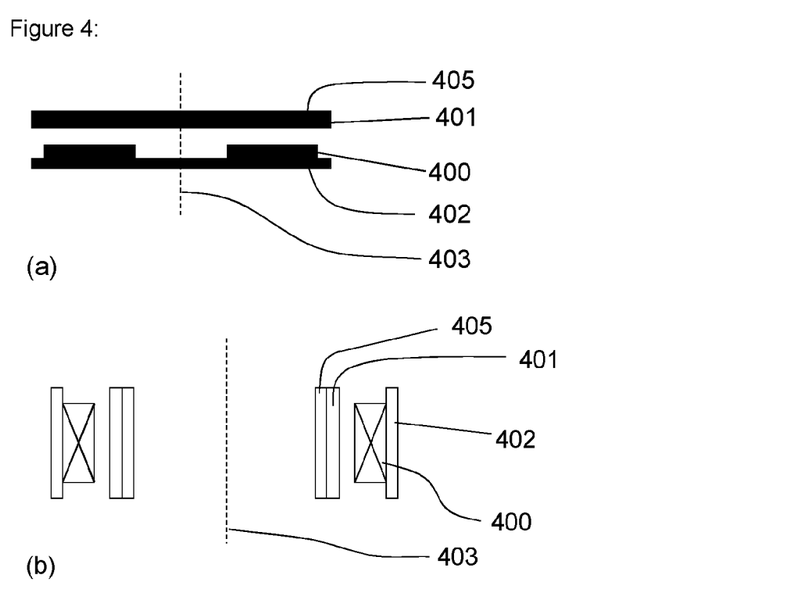
FIGS. 4(a)-(b) illustrate a second embodiment of the inductive temperature sensing system

FIG. 4(a) shows another embodiment of the inductive temperature sensing system in planar format. The coil configuration (400) is energised with an AC signal. The apparent impedance of the coil configuration is affected by the properties and temperature dependence of the target, which is split in two parts as shown in FIG. 4. The first part of the target is an electrically resistive material (401). Behind the resistive material (401) is a magnetically permeable material (405), being the second part of the target. The permeable material (405) can also function as a susceptor for absorbing inductive heating power. To this end, the permeable material (405) may also be conductive (to provide high eddy current losses), or it may have high magnetisation losses (so that an AC excitation causes high hysteresis losses). Together, the resistive material (401) and permeable material (405) form the target being sensed, essentially a composite version of the target (101) in FIG. 1. A permeable shielding material (402) can be used to reduce the amount of stray magnetic field that is present and improve both sensor sensitivity and inductive heating efficiency.

In this embodiment, the resistive material (401) is a material with a very high temperature coefficient of resistivity, such materials from which thermistors are made. For example, doped and sintered metal oxide semiconductors, doped semiconductor wafers, and doped ferroelectric materials, such as barium titanate-based compounds, are commonly used, and other materials will be known to those skilled in the art. If an thermistor material with a negative temperature coefficient (NTC) of resistance is used, there is an additional benefit that the thermistor layer has a self-limiting function on the inductive heating system. If an resistive material (401) with NTC properties gets too hot, the material starts to conduct strongly and incident electromagnetic energy from the coil configuration is reflected, instead of being absorbed by the permeable material (405). This self-limiting heating is most effective if the behaviour of the selected material has a semiconductor-metallic transition at the desired cut-off temperature (typically 150° C. to 250° C. for a domestic cooking appliance). For an resistive material (401) with NTC-properties, the curves in FIG. 3(b) would represent the decreasing temperature from $T_1$ (trace 320) to $T_3$ (trace 322) (i.e. $T_1 > T_2 > T_3$) as the conductivity rises more rapidly with increasing temperature than the susceptibility. For resistive material (401) with a positive temperature coefficient (PTC), the curves in FIG. 3(b) would represent the increasing temperature from $T_1$ (trace 320) to $T_3$ (trace 322) (i.e. $T_1 < T_2 < T_3$).

The coil configuration can be a wound component or a coil build by connections of a printed circuit board. The arrangement is illustrated in an axisymmetric format, with a symmetry axis (403). However, it will be apparent to those skilled in the art that the invention can also be applied in different formats, for example with a square or rectangular shaped coil configuration and target. FIG. 4(b) shows an inductive temperature sensing system in "wraparound" format, with the same labelling of parts as FIG. 4(a).

Figure 5:
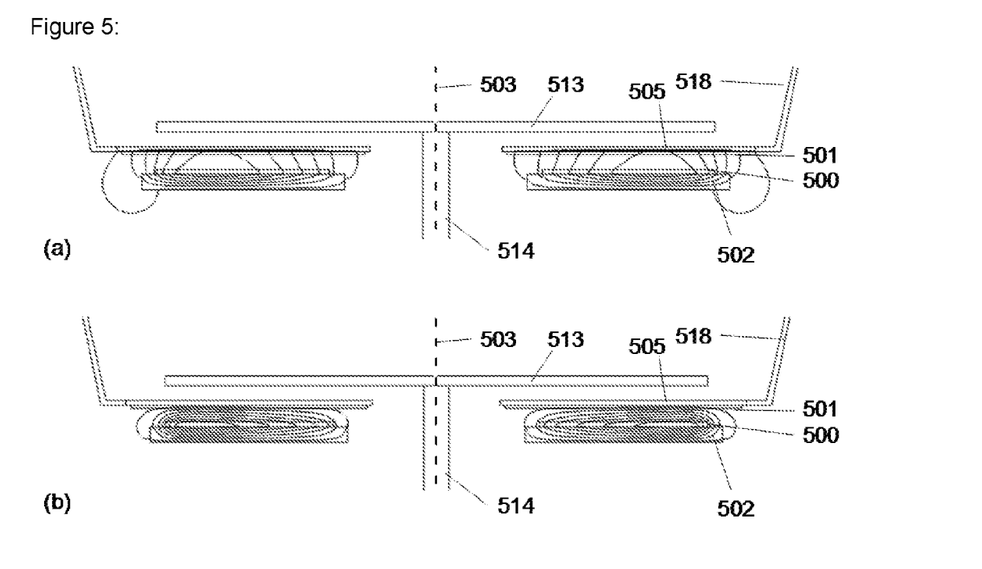
FIGS. 5(a)-(b) illustrate the magnetic field from the excited coil configuration

FIG. 5 shows a finite element simulation of the magnetic field using a planar format and a resistive layer (501) of thermistor material. The coil configuration (500), resistive layer (501) and permeable shield (502) are circular, with the symmetry axis shown as a dashed line (503). The magnetic field lines are overlaid on the model geometry. It can be seen that there is little or no stray field leakage which could cause unwanted heating of the sides of the bowl (518) or of the mixing blade (513) or mixing shaft (514).

In this example, the resistive layer (501) has a conductivity of around 30,000 S/m and the permeable material (505) is a magnetic steel. FIG. 5(a) shows the field at a frequency of 30 kHz. This is a frequency that might be used for inductive heating with high efficiency and low audible noise. The field largely passes through the thermistor layer (501) and heats the permeable material (505) attached to the base of the bowl (518) or building the bottom of the bowl. FIG. 5(b) shows the field at a frequency of 10 MHz. At this frequency, the field is largely reflected by eddy currents in the resistive layer (501) and the apparent resistance of the coil configuration is especially sensitive to the conductivity of the resistive layer (501).

Figure 6:
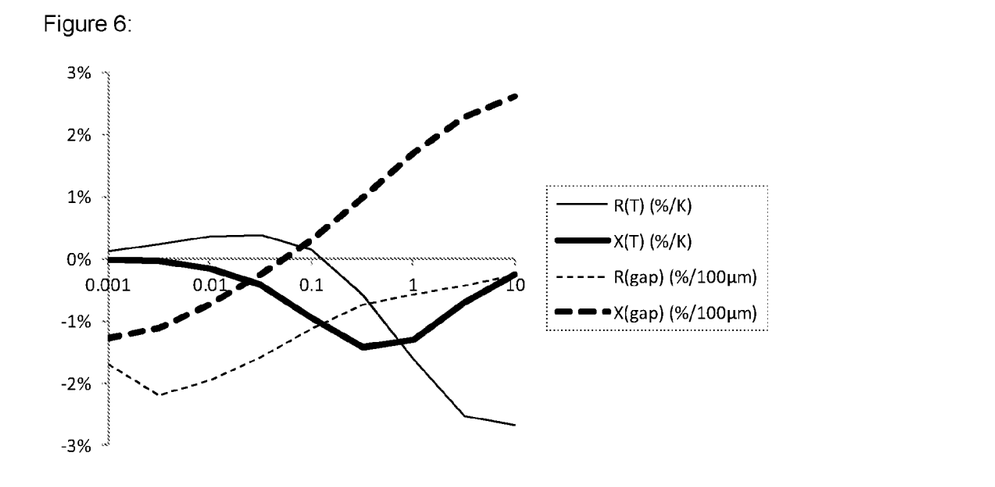
FIG. 6 illustrates the sensitivity of the apparent resistance and reactance of the coil configuration to changes in gap and temperature.

FIG. 6 shows the sensitivity of the real part of impedance (R) and imaginary part of impedance ($X = 2\pi \cdot f \cdot L$) to changes in temperature and gap for the arrangement in FIG. 5. The horizontal axis shows frequency in MHz and the vertical axis shows the fractional change in impedance for a given change in gap (0.1 mm) or temperature (1K). Sensing of the apparent inductance at approximately 80 kHz gives low sensitivity to gap, as X(gap) is zero at this frequency. This corresponds to sensing of the crossover frequency $f_0$. An alternative sensing regime is to measure changes in apparent resistance of the coil configuration at around 10 MHz. In this region, the signal from 1K temperature change is much greater than the signal due to 0.1 mm gap change. Hence, sensing with 1K accuracy in the presence of wide mechanical tolerances, such as those that might be achieved using low cost injection moulding parts, can be achieved.

Using a resistive layer (501) of 3000 S/m and a permeable material (505) of ferrite or magnetic steel gives a cross-over frequency of around 800 kHz. This higher cross-over frequency is advantageous in some applications, as it enables the use of even lower cost sensing using, for example, a coil configuration (500) realized as a printed circuit board and largely digital sensing electronics.

The order of the resistive layer (501) and permeable material (505) can be reversed, so that the permeable material is nearest the coil configuration. However, this arrangement only exhibits a cross-over frequency of the type described provided the permeable material (505) is fairly thin and/or of low susceptibility. For example, a 1 mm thick permeable material with susceptibility of 9 shows a cross-over frequency of 7 kHz in combination with a coil configuration (500) of around 100 mm in diameter. However, a similar layer with a susceptibility of 20 does not exhibit a cross-over frequency.

The presence of and/or distance to the target (101) can also be measured without additional measurement hardware, and often without significant additional measurement time. This is beneficial, for example, for safety purposes to ensure that the target is present before applying inductive heating power, or to adjust inductive heater settings to compensate for gap variations. The shape or gradient of inductance vs. frequency curve is one means to measure the gap, as this varies with the gap (as shown in FIG. 3(a)). An alternative method to measure the gap is to measure resistive part of apparent impedance of the coil configuration (100) R. The resistive part of apparent impedance is substantially independent of temperature of the target at a second cross-over frequency. This second cross-over frequency is illustrated graphically in FIG. 6, as the frequency at which the R(T) sensitivity curve crosses the frequency axis. In many configurations, this second cross-over frequency is close to the first cross-over frequency. If the two cross-over frequencies are sufficiently close to one another, no additional measurements have to be made for gap compensation, since impedance measurement (for example by the i-V method) typically obtains both R and X. Measurements at additional frequencies can be used to compensate for other confounding factors.

Figure 7:
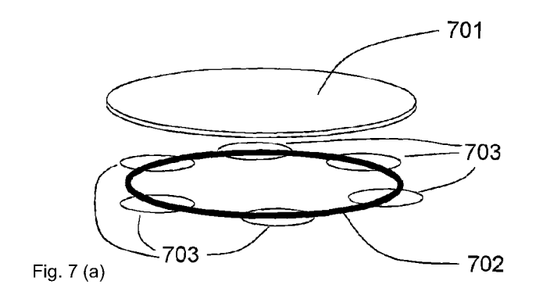
FIGS. 7(a)-(f) illustrate some alternative coil configurations for the invention.

FIG. 7 shows schematics of some alternative coil configurations for the sensing and induction heating, which may also be used as alternative embodiments of this invention. Separations are exaggerated for clarity. FIG. 7(a) shows a heating coil (702) and an array of sensing coils (703), along with a target (701). The use of multiple sensing coils (703) allows local monitoring of temperature to avoid hot-spots in the heating process. The sensing coils (703) may be substantially balanced with respect to the heating coil (702)

(such that the inductive coupling factor, k, is close to zero, i.e. |k|<<1). The use of balanced coils has the advantage that is more straightforward to simultaneously perform induction heating and temperature sensing without interrupting the heating.

FIG. 7(b) shows an arrangement with heating coil (702) and an array of sensing coils (703), along with a target (701). The sensing coils (703) are substantially balanced with respect to the heating coil (702). In this arrangement, the target could, for example, be a bearing, gear or shaft which is being heat treated. The target (701) is shown as being located inside coil arrangement, but could equally well be located adjacent to the coil arrangement.

FIG. 7(c) shows an arrangement with heating coil (702) and an array of sensing coils (703), along with a target (701). In this arrangement, the sensing coils (703) enclose sections of the heating coil and are substantially balanced with respect to the heating coil (702).

FIG. 7(d) shows an arrangement with an inductive heating coil (712) and sensing coil (713) which are substantially balanced with respect to one another. The target is shown as a disc (711) in this exploded view. The functions of the heating coil (712) and sensing coil (713) can be swapped, according to the detailed requirement for uniformity and efficiency of heating in a particular application. The coils can be wound components or coils realized as connections of a printed circuit board.

FIG. 7(e) shows a lateral field coil configuration (720) where a coil is wound around a permeable material (724) and acts on a target (721). An AC current is applied (723), which generates an AC magnetic field (722), which is coupled to the target (721). A coil configuration made of an array of coils can be used to heat and sense other target shapes. Heating and sensing coils can be wound orthogonally along the x and y axes of the core (724) for independent inductive heating and temperature sensing.

FIG. 7(f) shows a coil arrangement including a section of a heating coil (732) and a sensing coil (733). A permeable flux concentrator (731) is used to concentrate heating into a particular heated zone (734) on the target (701). A sensing coil (733) is coupled to the flux concentrator (731). Excitation via one part of the coil arrangement (i.e. the heating coil (732) or the sensing coil (733)) is detected at least one part of the coil arrangement to measure the local magnetic flux coupling and hence also the impedance. The temperature of the heated zone (734) of the target (701) can then be inferred from knowledge of the cross-over frequency.

Figure 8:
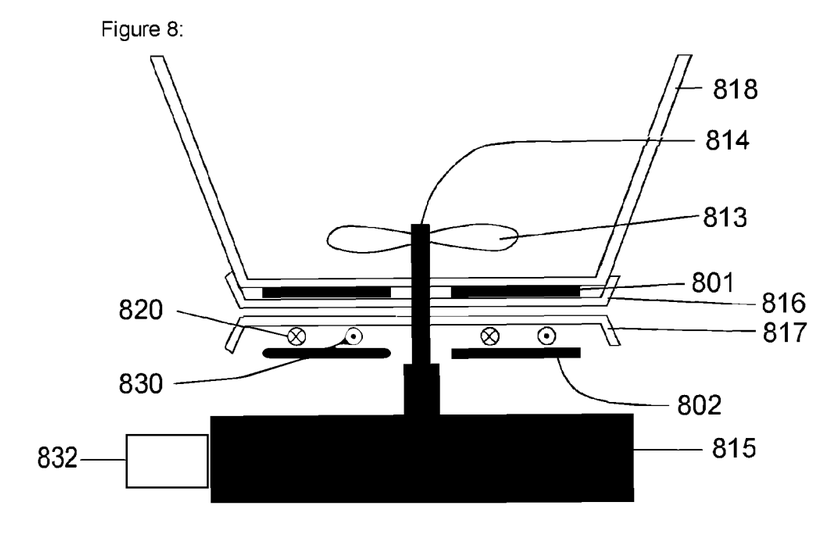
FIG. 8 illustrates a further embodiment of the inductive temperature sensing system.

FIG. 8 shows a planar format inductive temperature sensing system as part of a domestic food processor. In this arrangement, the coil configuration consists of two coils, one is wound with a positive polarity section (820) and one with a negative polarity section (830). The relative magnitudes of the currents through these sections are chosen so that the parasitic heating of the mixing blade (813) and mixing shaft (814) are low. The target (801) also serves as a susceptor material for inductive heating besides being sensed during measurements. Thermally insulating material (816, 817), such as plastic, foam or glass, is used to reduce heat flow from the hot bowl to the coil configuration. Preferably, some of the insulating material (816) is attached to the bowl, so that the user is protected from high temperatures, and some forms the casework (817) of the base unit. Additional shielding material (802) can further enhance efficiency and sensor sensitivity and reduce parasitic heating.

Figure 9:
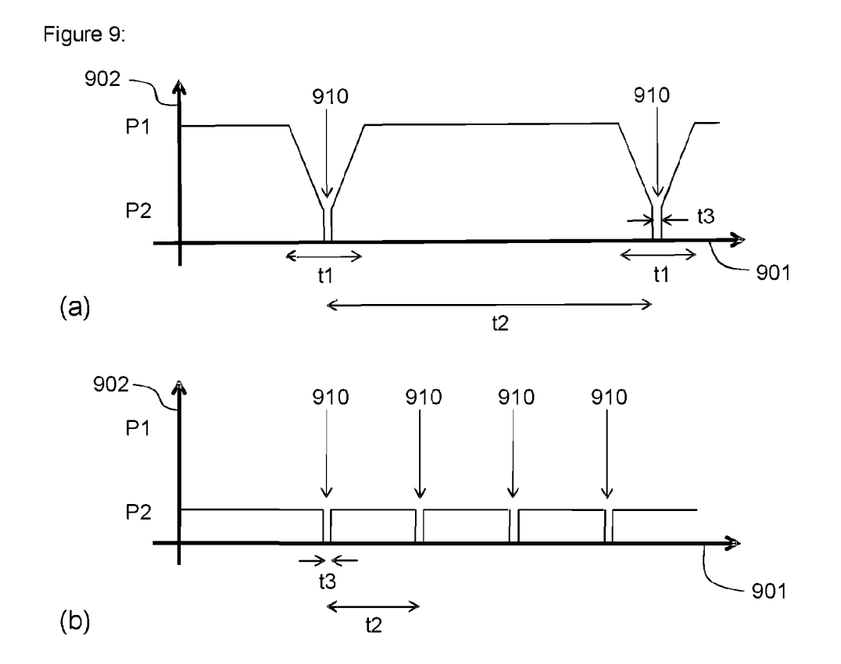
FIGS. 9(a)-(b) show a timing diagram for the combination of inductive heating and temperature sensing.

FIG. 9 illustrates the process of inductive heating and temperature sensing applied to this system. The horizontal axes (901) show time and the vertical axes (902) show inductive heating power. In this embodiment, the inductive power is interrupted in order to perform and inductive temperature measurement. Heating at a high power level is illustrated in FIG. 9(a). High power level P1 (>200 W) is applied for most of the time, and is interrupted at intervals, t2, to make a temperature measurement. In order to comply with long-term mains flicker limits, the power is ramped down to P2 (200 W) and then interrupted. The temperature measurement is then performed at low power in the window (910) with a short duration, t3. The power level is then stepped back to P2 and ramped back up to P1. The entire time taken to perform the temperature measurement (t1) may be approximately 0.7 seconds, and the measurement interval (t2) may be approximately 5 seconds, resulting in an acceptably high duty cycle for the application of heating power.

FIG. 9(b) illustrates the heating at low power levels. As the bowl or pan approaches the desired temperature, the power level can be reduced to P2. The time of heating interruption is shorter in this case, as the power P2 can be interrupted and restarted instantaneously without ramp-up or ramp-down phases. Consequently, the temperature measurement interval, t2, can be reduced, without adversely affecting the heating performance. This smaller sensing interval (t2) allows more accurate temperature control of the target, being part of the bowl. The sensing interval (t2) and off time (t3) can be adjusted by the control system 832 to maintain the desired temperature during cooking.

Preferably, the temperature controller produces a predicted value of temperature at the time of the measurement, and hence a predicted value of the crossover frequency. This then allows the inductance measurement to be performed at a single frequency (the predicted crossover frequency), with the output of the measurement being an error signal proportional to the difference between the measured inductance and the crossover inductance, $L_0$. This approach has the benefit that the temperature measurement can be very fast. For example, if $f_0$ is 20 kHz, and 20 cycles are used to reduce measurement noise, the temperature measurement can be performed in around 1 millisecond. In applications where a set temperature must be reached with a high accuracy, the measurement interval can be reduced or the measurement integration time can be increased as the temperature of the target approaches the set temperature.

Alternatively, measurements at several frequencies around $f_0$ can be used to more accurately determine the value of $f_0$ and hence the temperature of the target. The shape of the inductance vs. frequency curve can also be used to verify that a valid target is present and to determine the distance between the coil and the target.

In an alternative embodiment, the inductive power transfer is not interrupted to make a temperature measurement. The power transfer for inductive heating can be performed at the frequency required for temperature measurement, and the measurement circuit can be included in the power generation circuit. Alternatively, the power transfer can be at a different frequency to the temperature measurement, such that temperature measurements can be made whilst the power transfer is active and interference at the power transfer frequency can be filtered out. Alternatively, the coil configuration can be made of two separate components: a heating coil and a sensing coil, preferably with low mutual coupling between these two coils, so that temperature measurements can be made whilst the power is applied.

Most magnetic materials will display some time-dependent and/or non-linear behaviour of the magnetisation, and hence the measured susceptibility can depend on the drive amplitude of the impedance measurement and the magnetisation history of the target. In one preferred embodiment, the excitation circuit (104) is configured to provide a constant AC drive current amplitude, so that the magnetisation of the target is substantially fixed in amplitude. In addition to this or as an alternative, the excitation circuit (104) includes a DC bias current, so that the AC impedance measurement is performed on a substantially linear and repeatable portion of the magnetisation curve. Preferably, an AC power supply (preferably the one used for inductive heating in some embodiments) is configured to provide a de-gaussing effect on the target (removing any remanent magnetisation). De-gaussing waveforms typically have a high amplitude, which diminishes over time. For example, the ramp-down in power prior to temperature measurement illustrated in FIG. 9 (*a*) satisfies this requirement.

Many impedance measuring methods and circuits are known and could be used to measure the apparent impedance of the coil configuration of this system. Some suitable methods for use in combination with this invention are described briefly, although the list is not exhaustive and other methods will be obvious to those skilled in the art.

The I-V method applies an AC signal and measures the voltage and current passing. The AC signal could be a square wave produced by a microprocessor, with filtering of higher harmonics, a PWM-generated sine wave or the output from an analogue oscillator. The current measurement could be performed using a shunt resistor, current transformer or Hall sensor current probe. The imaginary part of impedance (reactance) can be measured by phase-sensitive detection, for example using a quadrature reference voltage and multiplier, or by sampling and analysis in the digital domain. The inductance is then calculated from the frequency f and reactance X. The I-V method has the advantage of being a fairly low cost approach.

Bridge methods use reference impedances in to detect small changes in the measured impedance and can have good stability and accuracy. A self-balancing bridge can be used to null out the resistive part of the impedance and find the frequency where the inductance is equal to a reference inductance. Ratiometric half-bridge uses a single reference impedance an applied and measured voltage and an op-amp. This can be used in conjunction with phase-sensitive detection to measure the inductance value.

Figure 10:
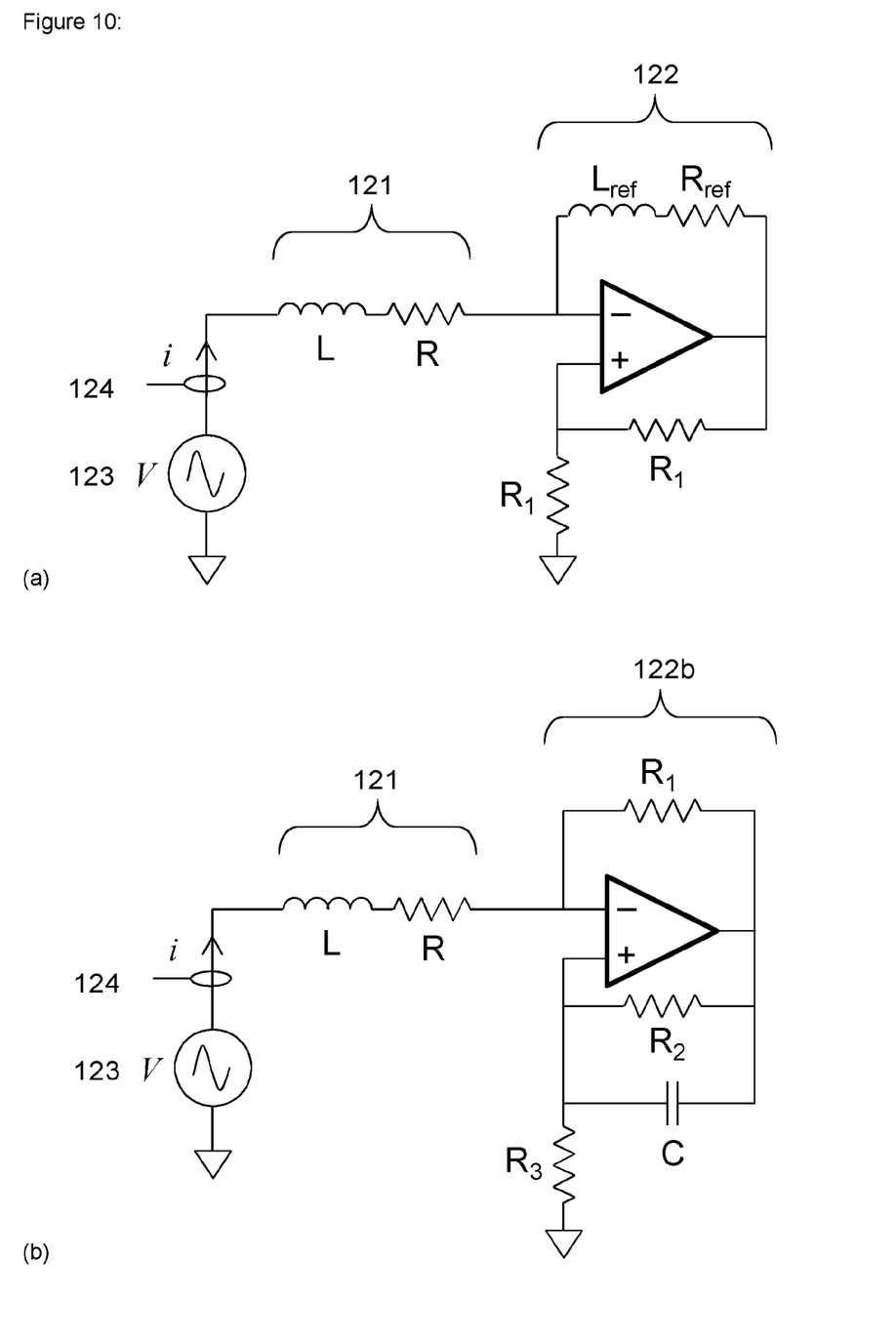
FIGS. 10(a)-(b) show a schematic of the measurement circuit using a negative impedance converter.

Resonant impedance methods use a capacitor in series or parallel to cancel out the inductive impedance. The impedance minimum the in series configuration (or impedance maximum in parallel configuration) can then be detected, either from the peak (or minimum) current or from the zero of phase (e.g. using a comparator and detecting the zero crossings). This can be applied using a fixed capacitor value, which can provide fairly accurate measurement over a limited temperature range. Using a variable capacitor (e.g. a varactor) or switched capacitors can provide the most accurate measurement, but has higher cost and longer measurement time. Replacing the capacitor with a negative inductor (built using a negative impedance converter) allows accurate temperature measurement over a wide temperature range. This has the advantages of low cost and fast measurement. FIG. 10 shows a schematic of the inductance measurement circuit using a negative inductor. The circuit includes an AC voltage source (123), a current measurement setup (124), the coil configuration being measured and modelled as a series connection of resistor R and inductor L in this case (121) and a negative impedance converter circuit (122). The coil configuration (121) has effective inductance, L, and resistance, R, the values of which vary with frequency and temperature. FIG. 10(*a*) shows an arrangement wherein the negative impedance circuit (122) produces an impedance of $-R_{ref}-j\omega L_{ref}$, with $R_{ref}$ being a reference resistor and $L_{ref}$ being the reference inductor. FIG. 10(*b*) shows an alternative implementation that has a lower cost and better stability because it does not use additional inductors. The negative impedance circuit (122*b*) produces an impedance of $$-R_1 R_3 \left( \frac{1}{R_2} + j\omega C \right),$$

so that the reference inductance is $L_{ref}=R_1 R_3 C$. An AC voltage is applied by the voltage source (123) at different frequencies. The phase of the current (i) is zero when the inductance of the coil configuration is equal to the reference inductance ($L=L_{ref}$). This occurs at the crossover frequency $f_0$. A maximum in the magnitude of the current may also be used to detect this point, in cases where the resistance of the coil configuration varies slowly with frequency. Hence, the phase zero or current maximum are used to detect $f_0$ and infer the temperature of the target. The circuit can be re-arranged so that one end of the coil configuration is grounded to reduce the effects of stray capacitance on the measurement. This can be achieved using a floating negative impedance converter, such as the one described in U.S. Pat. No. 4,151,493. Being able to connect one end of the coil configuration close to circuit ground allows low cost current measurement to be made by inserting a current measurement shunt resistor between the coil configuration end and the circuit ground.

In another embodiment of the invention, the excitation circuit is an oscillator, where the coil configuration makes up one element of the resonant circuit that determines the oscillation frequency. The coil configuration would be accompanied by one or more resonant capacitors, which are placed in the feedback loop of an amplifier. An example of this type of circuit is a Colpitts oscillator. One or more variable capacitors (e.g. varactors) can be used to adjust the tuning, as is done in a voltage-controlled oscillator (VCO) circuit. The measurement circuit then measures the frequency of the oscillation. The value of the inductive part of the impedance of the coil configuration at the oscillation frequency can be inferred from the values of the other resonant components. The value of the variable capacitor(s) can be adjusted so that the oscillation frequency is close to the cross-over frequency.

Measuring the impedance by measuring the current in the inductive heating circuit is a method that can be applied with very low added cost to an inductive heating system. This can be performed by measuring the current input to a half-bridge inverter at two different switching frequencies. The current in single switch quasi-resonant inverter can also be measured in this manner. This method of impedance measurement has the disadvantage that the measurement accuracy is limited due to other constraints on the power electronics design.

Figure 11:
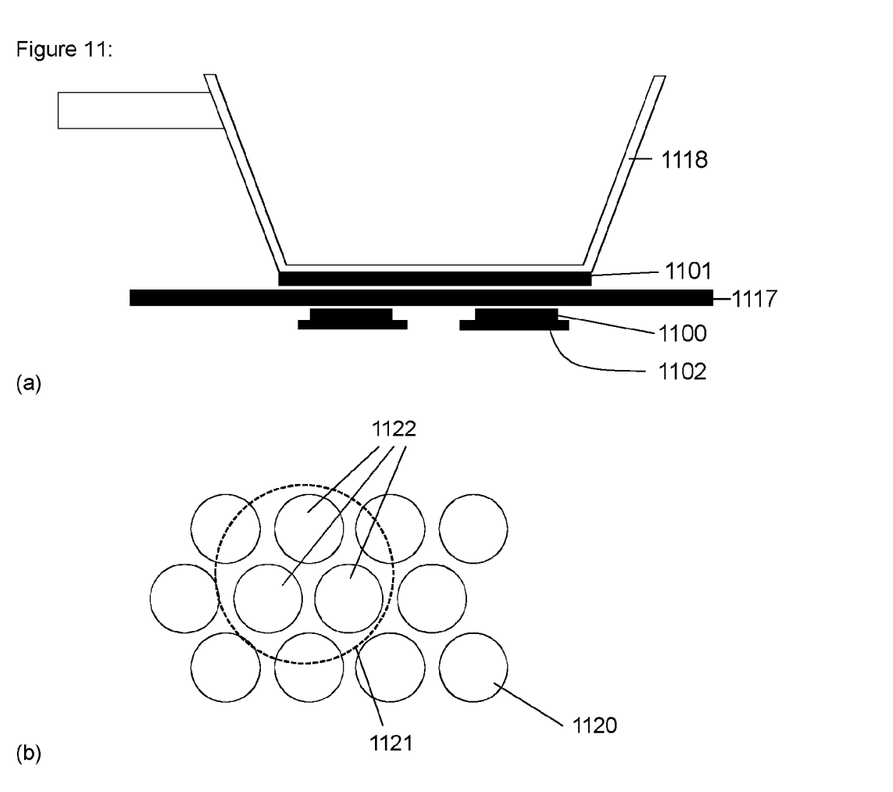
FIGS. 11(a)-(b) illustrate an embodiment of the inductive temperature sensing system as part of an inductive hob system.

FIG. 11 (*a*) illustrates an embodiment of the inductive temperature sensor as part of an inductive hob system. The coil (1100) and shielding material (1102) are located on one side of the hob surface (1117) and are used to sense the temperature of the base (1101) of a pan (1118) by sensing the apparent inductance at the cross-over frequency, or measuring the cross-over frequency. The coil (1100) may also be used for inductive heating of the pan.

FIG. 11 (b) illustrates an embodiment of the inductive temperature sensor as part of an inductive hob system, where the pan may be of various sizes and/or in various locations on the hob surface. Shown in plan view, a coil array (1120) is located under the hob surface. The outline of a pan base (1121), located on top of the hob, is also shown. One or more of the coils are located underneath the pan. These coils (1122) can be used to sense the pan temperature, according to the present invention. They may also be used as inductive heating coils.

Figure 12:
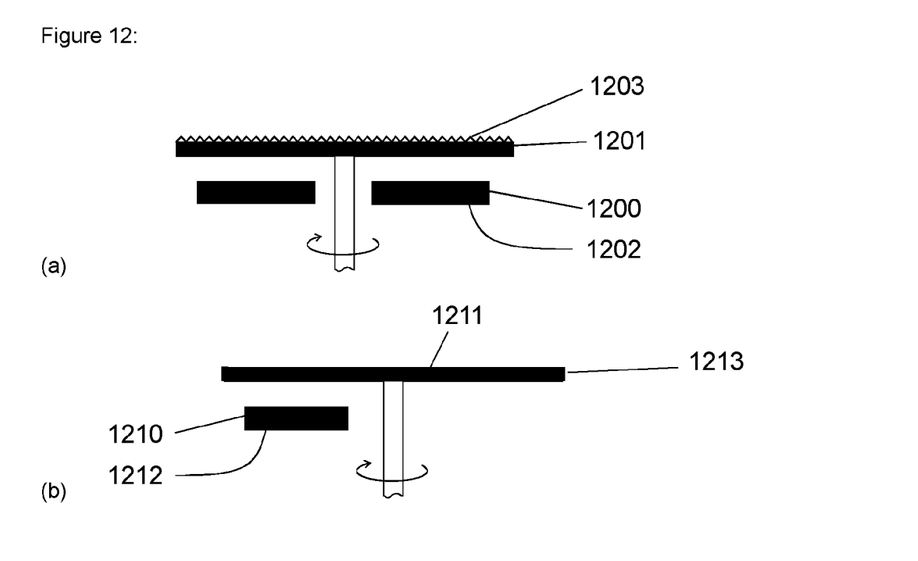
FIGS. 12(a)-(b) illustrate an embodiment of the inductive temperature sensing system as a temperature sensor for a rotating tool.

FIG. 12 (a) illustrates an embodiment of the inductive temperature sensor as a temperature sensor for a rotating tool. In this embodiment, a coil (1200) is wrapped around the rotating shaft and used to sense the temperature of the rotating part (1201). The cutting/drilling/grinding/sanding face (1203) of the tool is shown opposite the sense coil, although it could also be on the circumference of the rotating part for some tools, such as circular saws. A shielding material (1202) is used to direct the field from the coil (1200) towards the portion of the rotating part (1201) that is to be sensed. The temperature of the rotating part is sensed by measuring the inductance close to the cross-over frequency or measuring the cross-over frequency.

Figure 13:
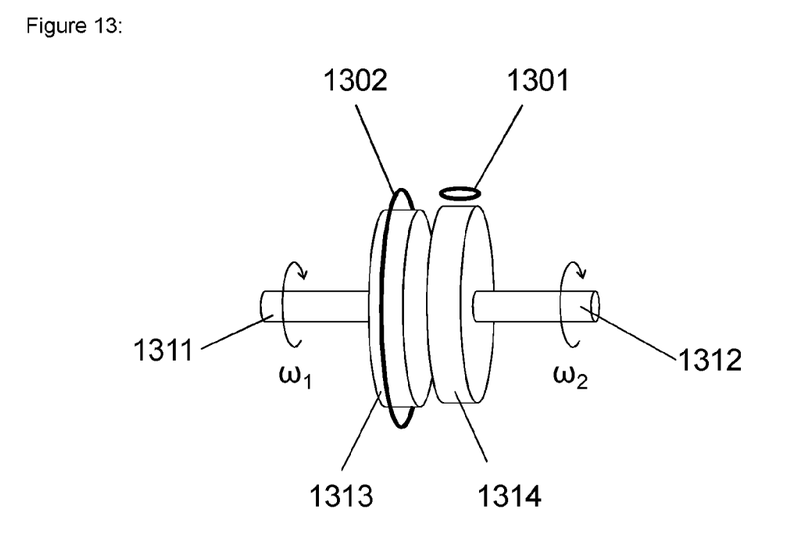
FIG. 13 illustrates an embodiment of the inductive temperature sensing system for sensing the temperature of rotating frictional components.

FIG. 13 illustrates an embodiment of the inductive temperature sensor for sensing the temperature of rotating frictional components, such as clutches, brakes, or rotating mechanical seals. Such components generate heat, and can generate excess heat in fault conditions and should not be operated above certain safe temperature limits. Hence, a reliable, low cost, non-contact temperature measurement method is highly beneficial. The rotating frictional components (1313, 1314) are shown being driven by rotating shafts (1311, 1312), although in some systems one of the frictional components is non-rotating. The sense coil for inductive temperature sensing may be located adjacent to one of the frictional components (1301) or may be located circumferentially around one of the frictional components (1302). The temperature of the frictional component is sensed by the coil (1301 or 1302) by measuring the cross-over frequency or the inductance close to the cross-over frequency.

Figure 14:
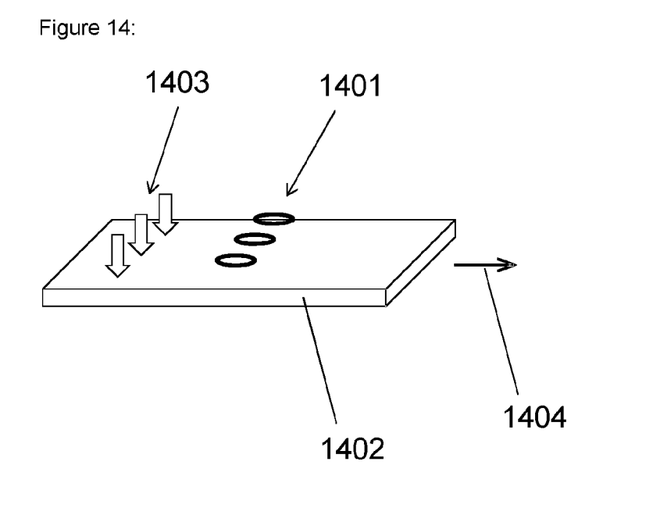
FIG. 14 illustrates an embodiment of the inductive temperature sensing system for monitoring heat treatment processes.

FIG. 14 illustrates an embodiment of the inductive temperature sensor for monitoring heat treatment processes. A sense coil or coil array (1401) is used to measure the temperature of a target material (1402). In continuous processes, the target material may be moving along a direction of travel (1404). Heat may be applied by infrared, flame, plasma, inductive heating or in an oven. Application of heat (1403) slightly upstream of the sensing location is illustrated in the figure, although the location can be the same or the sense coil can be movable, in order to sense the temperature at different locations. Induction hardening and annealing of steel are two example processes where inductive temperature sensing would be beneficial. For induction heating processes, the sensing and heating can be performed using the same coil or two separate coils can be used for the two functions. Heating processes for painting or powder coating of steel would also benefit from inductive temperature sensing. Infrared temperature sensing can be difficult to apply in these environments, due to variable emissivity of the substrates and lack of line-of-sight access.

Identification and/or calibration data for the part whose temperature is being sensed can be held on the part being sensed, as part of a bar code or any other optical pattern, RFID tag or mechanical interlock feature. This allows calibration for material properties, which may vary from part to part.

There are many potential applications for this invention, including combined inductive heating and temperature sensing for domestic cookers, domestic food processors, and industrial ovens. Combination with industrial induction heating systems for applications such as induction-hardening of steels, tempering, annealing, welding, soldering and brazing, extrusion, rolling, joining of plastics, application of plastic coatings, powder coating, paint drying, curing of adhesives, cap sealing, debonding of plastic and rubber for recycling, semiconductor and glass production. Temperature sensing of vibrating, translating and rotating parts is also well-suited to this method. Potential applications include industrial temperature sensing, in particular of steels, for example in controlling mould tool temperature, sensing of automotive and aerospace components such as brake discs and engine parts, sensing of cutting tool temperature, control of sterilisation processes, temperature monitoring of machines and drives, sensing of heat exchanger temperatures. Non-contact sensing of temperature in harsh or inaccessible environments covers another set of applications where the benefits of this invention are important, for example at very high or very low temperatures, at pressure or vacuum, in chemical reaction vessels. This is by no means an exhaustive list and other applications will be apparent to those skilled in the art.

The invention claimed is:

1. An apparatus for inductive temperature sensing comprising a coil configuration, a target disposed adjacent to the coil configuration, and an impedance measurement circuit, wherein
   the target has a non-zero conductivity and susceptibility;
   the impedance measurement circuit measures an apparent inductance of the coil configuration at a measurement frequency close to a crossover frequency to provide an indication of a temperature of the target;
   the measurement frequency is the frequency at which the apparent inductance is measured; and
   the crossover frequency is the frequency at which the apparent inductance of the coil configuration equals a known inductance of the coil configuration without the target for a given temperature.

2. An apparatus according to claim 1, wherein the measurement frequency is between 70% of the crossover frequency and 130% of the crossover frequency.

3. An apparatus according to claim 1, wherein the measurement frequency is between 90% of the crossover frequency and 110% of the crossover frequency.

4. An apparatus according to claim 1, further comprising an inductive heating circuit disposed adjacent to the target for inductively heating the target.

5. An apparatus according to claim 1, wherein the target is arranged to function as an induction heating target as well as a sensing target.

6. An apparatus according to claim 1, wherein the impedance measurement circuit measures a resistive part of an apparent impedance of the coil configuration close to or exactly at a second crossover frequency, defined as the frequency at which the resistive part of the apparent impedance of the coil configuration is substantially independent of the temperature of the target.

7. An apparatus according to claim 1, wherein the coil configuration comprises an inductive heating coil and a sensing coil.

8. An apparatus according to claim 1, wherein the target is made of a material or a composite of materials which have a conductivity that decreases as temperature increases over the measured range.

9. An apparatus according to claim 1, wherein the target is made of a material or a composite of materials which have a susceptibility that decreases as temperature increases over the measured range.

10. An apparatus according to claim 1, wherein the target material is magnetic steel.

11. An apparatus according to claim 1, wherein the coil configuration and target are substantially planar.

12. An apparatus according to claim 1, wherein the coil configuration is wrapped around the outer perimeter of the target.

13. An apparatus according to claim 1, wherein the coil configuration comprises a sensing coil and a heating coil separated from each other.

14. An apparatus according to claim 13, wherein the sensing coil is substantially balanced with respect to the heating coil such that an inductive coupling factor is close to zero.

15. An apparatus according to claim 14, arranged such that an induction heating from the heating coil can be interrupted in order to make a temperature measurement of the target.

16. An apparatus according to claim 15, arranged such that the interval between temperature measurements can be varied using a control system.

17. An apparatus according to claim 1, wherein the apparatus is configured to rotate machinery, and wherein the target is rotatable or movable with respect to the coil configuration.

18. An apparatus according to claim 1,
wherein the coil configuration further comprises an inductive heating coil, and
wherein the target is composed of a susceptible material for inductive heating of the target.

* * * * *